Patented Oct. 31, 1922.

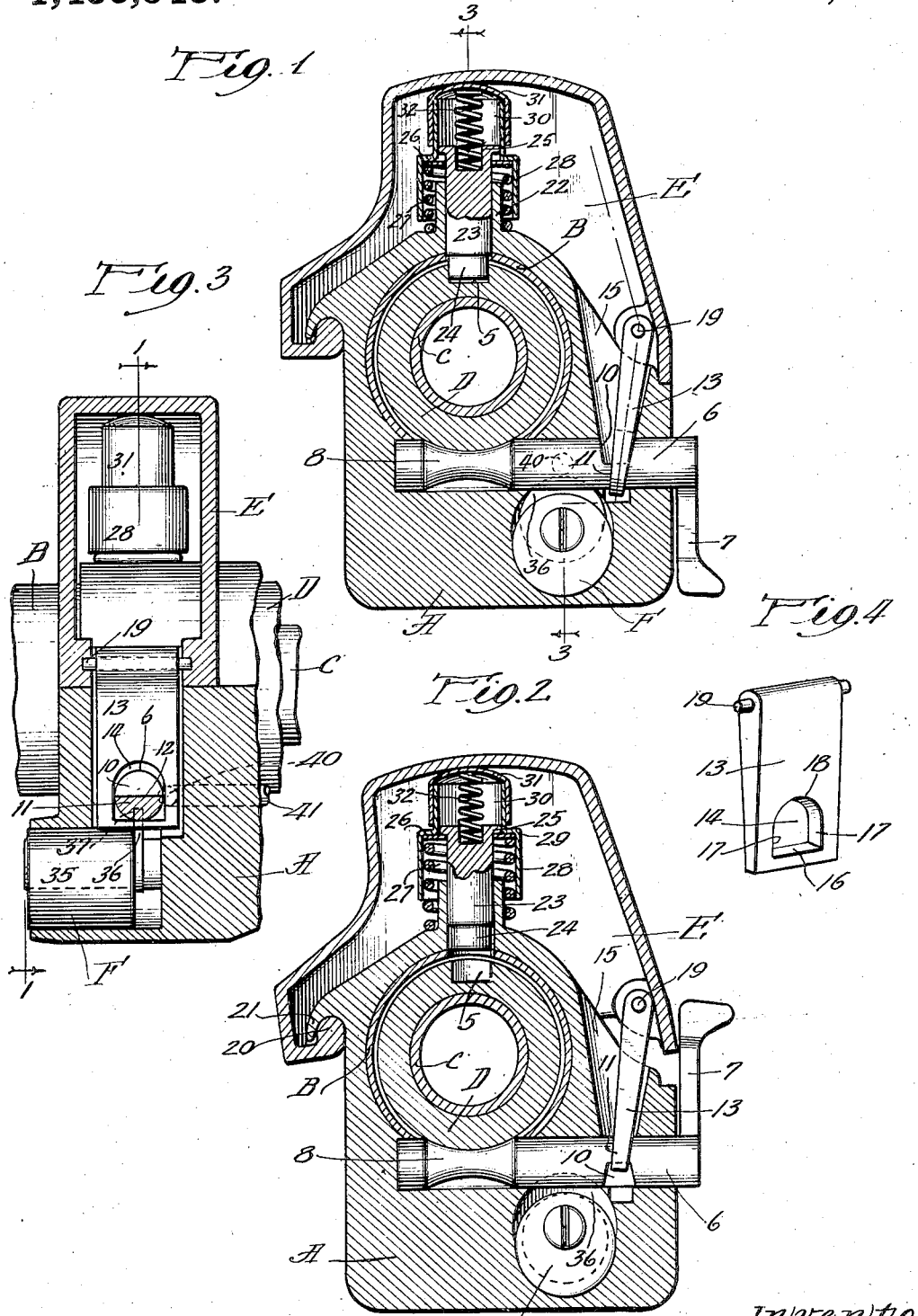

1,433,548

UNITED STATES PATENT OFFICE.

ORVILLE S. HERSHEY, OF STOUGHTON, WISCONSIN, ASSIGNOR TO HERSHEY MANUFACTURING COMPANY, OF DENVER, COLORADO, A CORPORATION OF COLORADO.

AUTOMOBILE LOCK.

Application filed January 31, 1921. Serial No. 441,156.

*To all whom it may concern:*

Be it known that I, ORVILLE S. HERSHEY, a citizen of the United States, residing at Stoughton, in the county of Dane and State of Wisconsin, have invented certain new and useful Improvements in Automobile Locks, of which the following is a specification.

This invention relates to improvements in automobile locks, and more particularly to locks of the type that are associated with the steering column of a motor driven vehicle to secure against rotation the post extending therethrough which connects with the steering wheels.

It is a primary object of my invention to provide a lock of simple, practical and efficient construction which may be contained within a housing that surrounds the steering column of an automobile, and, if desired, be secured to the dash or instrument board thereof. Other objects as well will hereinafter appear in the description and claims to follow, wherein this invention is represented as consisting of a certain construction and arrangement of parts of which one exemplification is shown in the accompanying drawings in the manner following:

Figure 1 is a transverse section taken on line 1—1 of Fig. 3, illustrating the present lock within its associated housing, the parts showing the steering post as held against rotation;

Fig. 2 is a view similar to Fig. 1, excepting that the parts are here shown in unlocking position;

Fig. 3 is a longitudinal section taken on line 3—3 of Fig. 1; and

Fig. 4 is a detail in perspective of the link which connects the hasp to the operating shaft.

The lock shown in the drawing is contained within a housing A adapted for mounting upon the column B of an automobile steering mechanism. Within the column is the usual steering post C, here represented as a tube, and spaced away from the walls of the column. In the region of the lock, a collar D is secured fast to the post, there being a longitudinal groove 5 formed in the collar. Since the collar is associated with the post primarily to facilitate construction, and is to all intents and purposes a part thereof, it will be so treated in the description and claims to follow.

Within the housing is a bore for the reception of a shaft 6 which is provided with an operating lever 7, and formed in the shaft is an annular groove 8 having a longitudinal curvature that is concentric with the curvature of the steering post, the operating shaft being positioned adjacent the collar as shown in Figs. 1 and 2. To permit of this relation the column is shown to be provided with a suitable opening through which the shaft is extended. This is the preferred arrangement as the parts may thereby be more compactly related, and a means be provided for holding the shaft against endwise movement.

At one point in the shaft is a transverse slot 10 extending approximately to its center, the remaining portion of the shaft in the plane of this slot, designated as 11, thereby becoming an eccentric. By preference the slot 10 is so formed as to provide a flat surface 12 which lies in substantially diametrical relation to the shaft. Co-operating with this slot is a link 13 (see Fig. 4) having at one end an opening 14 within which the eccentric 11 may lie, the housing being provided with a chamber 15 in which this link is received. The opening 14 is preferably formed with one flat side 16 from which extend parallel sides 17 which curve toward each other to provide an arch 18, the opening so formed being specially suitable for co-operation with the eccentric in a manner which will hereinafter be set forth.

As by means of a pintle 19 the link is pivotally mounted adjacent one end of a hollow member E which may be termed a hasp. The end of this hasp which is opposite the link is preferably formed with a shoulder 20 which underlies a second shoulder 21 that is formed upon the housing A, these two shoulders co-operating to form in effect a hook connection. The end of the hasp to which the link is connected is adapted to swing away from the housing A around the hook connection as a center, and means are provided for normally urging the hasp to open position which may comprise the following:

Extending laterally from the housing A into the enclosure provided by the hasp is a circular wall 22 within which is a slidable bolt 23 having an acting end 24 adapted to enter the groove 5 of the collar D to lock the steering post against rotation. Formed at the opposite end of this bolt is an outwardly extending shoulder 25 which overlies a circular plate or washer 26, and a coiled spring 27 whose opposite end is pressed against the housing A to normally hold the bolt 23 away from the steering post. Surrounding this spring is a sleeve 28 which is inturned as at 29 to provide a shoulder which overlies the plate or washer 26, the sleeve being upwardly extended therebeyond to form an extension 30 over which is fixedly arranged a cap 31. Between the cap and bolt 23 is a second coiled spring 32, weaker than the other spring 27 but tending at all times to project the bolt 23 toward the steering post, and to cause the same to engage therewith whenever the hasp is moved to closed position. The assembly of parts just described provides a locking means adapted to hold the steering post against rotation and also a means which normally urges the hasp to open position whenever the shaft 6 is rotated properly for this purpose.

The movements of the operating shaft are governed by a key-controlled lock F which, in the construction shown, is provided with rotatable cylinder 35 from which projects laterally a disk 36 which is adapted for entry into a slit 37 formed in the shaft 6. One or more of these slits may be provided, according to the number of positions in which it is desired that the operating shaft shall be locked. Obviously when the shaft is locked, it may not be rotated, except by the application of a proper key to the lock to first withdraw the disk 36 from engagement with the shaft.

Referring again to the link connection between the operating shaft and hasp, I would have it noted that when the steering mechanism is unlocked, the parts are related about as shown in Fig. 2. It will here be observed that the flat side 12 of the eccentric is in contact with the flat side 16 of the link aperture, and in this position the shaft will tend to remain due to the pull upon the link which is occasioned through the action of the spring 27 which urges the hasp to open position.

The construction herein shown represents a simple assembly which may be securely mounted within a housing so as to be protected to the fullest degree. This housing may be mounted upon the steering column in any desired manner, or, if preferred, may be anchored to the dash or instrument board, or elsewhere.

In Fig. 3 I have also shown a ball 40 adapted to lie partially within a socket formed in the shaft 6, the ball co-operating with a pin 41 which connects with a switch (not shown) to break the ignition circuit. A further description of these parts is not deemed necessary, since it may follow the general construction shown in my pending application Serial No. 426,894.

I claim:

1. A device of the kind described, comprising a housing adapted for attachment to an automobile steering column and having an opening to receive a locking bolt, a hasp pivoted on the housing, a locking bolt adapted to be projected inwardly through the opening in the housing by movement of the hasp, a key controlled operating shaft, and a link connection between the shaft and the hasp adapted to normally prevent opening of the latter, substantially as described.

2. A device of the kind described, comprising a housing adapted for attachment to an automobile steering column, an operating shaft rotatable therein and provided with an eccentric, a hasp pivoted to the housing, a spring held locking bolt mounted in the housing adapted to be projected inwardly thereof by movement of the hasp, and a link connection between the hasp and the shaft eccentric adapted to draw the former toward the housing when the shaft is rotated to a selected position, substantially as described.

3. A device of the kind described, comprising a housing adapted for attachment to an automobile steering column, a shaft rotatably mounted therein provided with an eccentric and having operating means therefor exteriorly of the housing, there being a slit within the housing, a key-controlled lock mounted within the housing, a disk eccentrically carried by the lock and adapted to enter the slit in the shaft when the lock is in a selected rotative position, a spring held locking bolt mounted in the housing, means movably arranged upon the housing adapted to project the bolt into locking position when said movable means is drawn toward the housing, a link connecting said means with the shaft eccentric adapted to draw said means toward the housing when the shaft is turned to a selected rotative position, substantially as described.

4. A device of the kind described, comprising a housing adapted for attachment to an automobile steering column, a spring held locking bolt mounted in the housing, a shaft rotatably mounted in the housing provided with an eccentric having one flat side, means carried by the housing adapted to project the locking bolt inwardly, and a link connecting said means with the shaft eccentric, the link being provided with an opening having one flat side adapted to engage with the flat side of the eccentric only when said means is so positioned that the locking bolt is projected outwardly from the housing, substantially as described.

5. A device of the kind described, comprising a housing adapted for attachment to an automobile steering column, a locking bolt adapted to be projected inwardly of the housing, spring means tending normally to hold the bolt in an outward position, means movably carried on the housing adapted when moved toward the housing to project the locking bolt into operative position, and a key-controlled operating shaft having connection with said means adapted both to draw the same toward the housing to project the locking bolt into operative position and to limit the movement of said means away from the housing, substantially as described.

ORVILLE S. HERSHEY.

Witness:
EPHRAIM BANNING.